US006863429B2

(12) United States Patent
Torghele et al.

(10) Patent No.: US 6,863,429 B2
(45) Date of Patent: Mar. 8, 2005

(54) DOUGH MIXER WITH METERING DEVICE

(75) Inventors: Claudio Torghele, Viganello (CH); Pierluigi Malfatti, Reverto (IT)

(73) Assignee: Artos, S.A., Lugano (CH)

( * ) Notice: Subject to any disclaimer, the term of this patent is extended or adjusted under 35 U.S.C. 154(b) by 90 days.

(21) Appl. No.: 10/030,287

(22) PCT Filed: Apr. 25, 2001

(86) PCT No.: PCT/EP01/04656

§ 371 (c)(1),
(2), (4) Date: Jul. 22, 2002

(87) PCT Pub. No.: WO01/85323

PCT Pub. Date: Nov. 15, 2001

(65) Prior Publication Data

US 2003/0010217 A1 Jan. 16, 2003

(51) Int. Cl.[7] .............................. A21C 1/06; A21C 1/14; B01F 15/02
(52) U.S. Cl. ................... 366/76.92; 366/99; 366/155.1; 366/181.3; 366/193
(58) Field of Search .............................. 366/76.9, 76.92, 366/76.93, 96–99, 155.1, 155.2, 168.1, 172.2, 181.1, 181.2, 181.3, 183.1, 192–193, 288; 99/348

(56) References Cited

U.S. PATENT DOCUMENTS

| | | | | |
|---|---|---|---|---|
| 1,700,510 A | * | 1/1929 | Oches | 366/76.93 |
| 2,073,567 A | * | 3/1937 | Sciarra | 366/71 |
| 2,084,773 A | * | 6/1937 | Mason et al. | 366/99 |
| 2,112,927 A | * | 4/1938 | Pierre | 366/99 |
| 2,145,428 A | * | 1/1939 | Motta | 366/99 |
| 2,482,256 A | * | 9/1949 | Freed | 366/99 |
| 3,503,344 A | * | 3/1970 | Sternberg | 366/99 |
| 3,631,818 A | | 1/1972 | Zito | |
| 3,682,106 A | | 8/1972 | Kuhlman | |
| 3,735,692 A | | 5/1973 | Marchignoni | |
| 4,010,932 A | | 3/1977 | Otto | |

(List continued on next page.)

FOREIGN PATENT DOCUMENTS

| | | |
|---|---|---|
| AU | 62443/86 | 8/1986 |
| EP | 0 056 346 A1 | 7/1982 |

(List continued on next page.)

*Primary Examiner*—Charles E. Cooley
(74) *Attorney, Agent, or Firm*—Woodcock Washburn LLP

(57) ABSTRACT

In a dough mixer for preparing dough, the essentially cylindrical chamber with horizontal axis within which kneading elements (4, 4c, 4b) rotate coaxially or parallel to this axis, between two casing surface sections (1a) with the same casing line, two level surface sections (1b, 1c) which are essentially formed by the surface of sliding (2b, 3b) blades (2, 3) with upper charging opening (2a) and lower discharging opening (3a) in closed position, and the aforementioned surfaces (1a, 1b, 1c) turn into two front, coaxial, separated circular surfaces (1e, 1f) via rounded areas (1g) with the largest possible radius, such that, together with the rotating (4a) kneading element (4, 4c, 4d), which likewise has very round forms, they enable the preparing and compressing of dough and rolling into balls of an individual dough portion that is discharged without residue of ingredients or dough. The metering device for charging the dough mixer with volumetric calibrated and the most homogeneous portion of flour-like ingredients has a vertical shaft (8) that rotates coaxially (8a) to the cylindrical container (5, 5a, 5b), which drives stirring elements (7a, 7b), a distribution cone (7) and a metering disk (9a) with metering holes (9a) positioned on the rim that are equidistant both from one another and from the axis. The container of the metering device is divided on the inside by an annular, funnel-like partition (6) into an upper container and a lower, smaller region for the metering mechanism.

24 Claims, 2 Drawing Sheets

U.S. PATENT DOCUMENTS

| | | | |
|---|---|---|---|
| 4,087,079 A | | 5/1978 | Kramer |
| 4,093,506 A | | 6/1978 | Richter |
| 4,331,858 A | | 5/1982 | Wagner |
| 4,417,867 A | | 11/1983 | Bauer |
| 4,630,930 A | | 12/1986 | Seiling |
| 4,650,337 A | * | 3/1987 | Otto ............................ 366/70 |
| 4,723,614 A | | 2/1988 | Lahti |
| 4,749,581 A | | 6/1988 | Gorsuch et al. |
| 4,771,913 A | | 9/1988 | Johndrow et al. |
| 5,113,754 A | | 5/1992 | Robinson |
| 5,121,677 A | | 6/1992 | Le Claire et al. |
| 5,126,159 A | | 6/1992 | Manser et al. |
| 5,144,879 A | | 9/1992 | Alessi |
| 5,158,782 A | * | 10/1992 | Hayashi et al. ............. 425/200 |
| 5,310,569 A | * | 5/1994 | Muller ........................ 366/99 |
| 5,322,368 A | | 6/1994 | Tanaka et al. |
| 5,400,699 A | | 3/1995 | Cailbault |
| 5,413,473 A | * | 5/1995 | Takano ........................ 425/200 |
| 5,486,049 A | | 1/1996 | Boatman et al. |
| 5,512,312 A | | 4/1996 | Forney et al. |
| 5,630,358 A | | 5/1997 | Patel |
| 5,921,170 A | | 7/1999 | Khatchadourian et al. |
| 5,997,924 A | | 12/1999 | Olander, Jr. et al. |
| 6,161,955 A | * | 12/2000 | Rademaker .................. 366/97 |
| 6,183,124 B1 | * | 2/2001 | Voegtlin ...................... 366/91 |
| 6,245,370 B1 | | 6/2001 | Pilati et al. |
| 2001/0024671 A1 | | 9/2001 | Pilati et al. |

FOREIGN PATENT DOCUMENTS

| | | | |
|---|---|---|---|
| EP | 0 554 926 A1 | | 8/1993 |
| EP | 0 708 421 A1 | | 4/1996 |
| EP | 1 151 788 A1 | | 11/2001 |
| GB | 237889 | | 2/1926 |
| JP | 3-201956 | * | 9/1991 |
| JP | 5-304870 | * | 11/1993 |
| JP | 7-327577 | * | 12/1995 |
| JP | 2003-92979 | * | 4/2003 |
| WO | WO 90/13229 | | 11/1990 |
| WO | WO 96/32844 | | 10/1996 |
| WO | WO 98/04137 | | 2/1998 |
| WO | WO 99/08537 | | 2/1999 |

\* cited by examiner

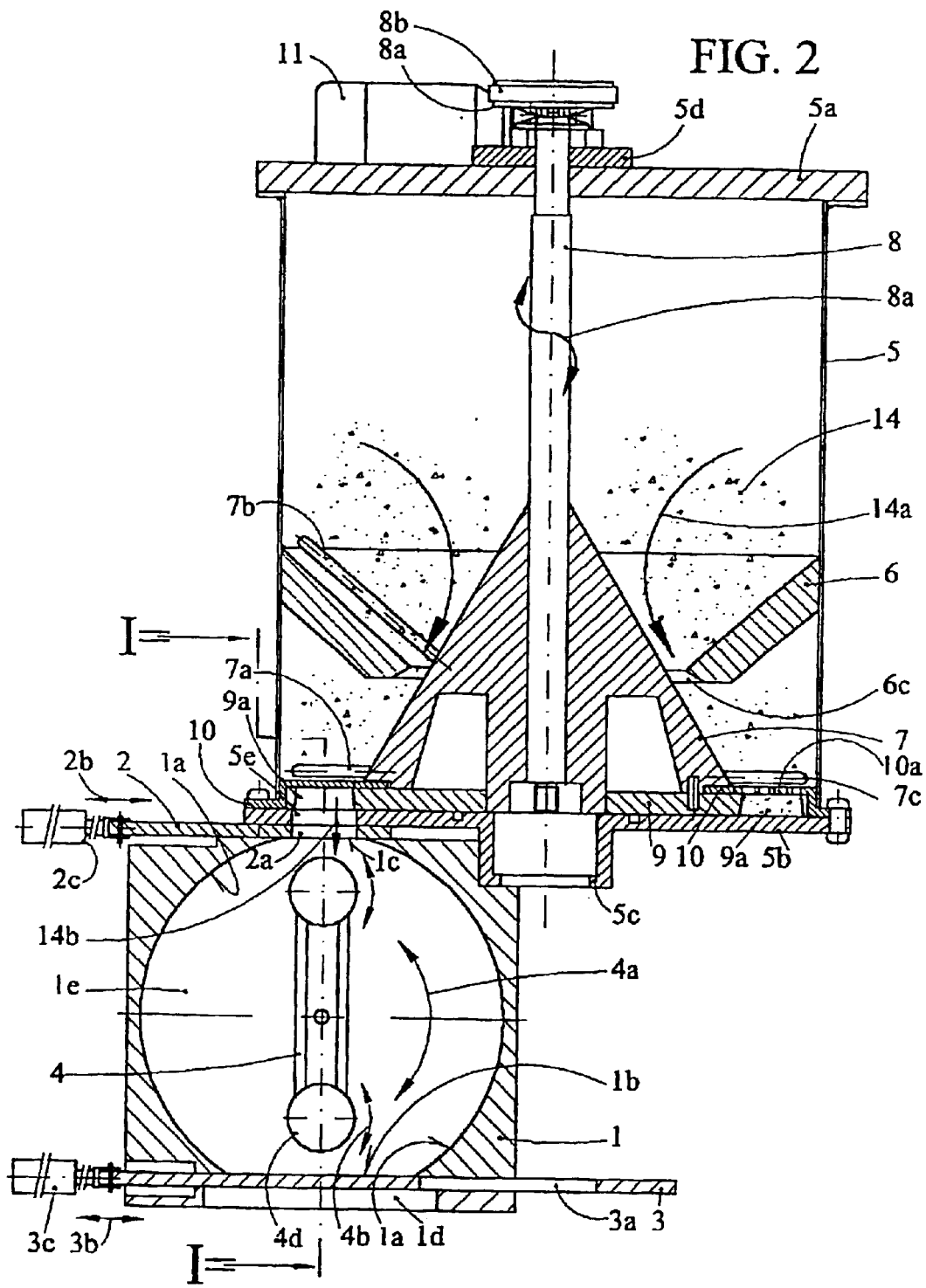

DOUGH MIXER WITH METERING DEVICE

CROSS-REFERENCE TO RELATED APPLICATIONS

This application is a national stage of International Application PCT/EP01/04656 having an international filing date of Apr. 25, 2001; which application claims benefit of European Community Application No. 00109611.4, filed May 5, 2000.

FIELD OF INVENTION

The present invention relates to preparing dough; and more particularly to methods and systems for preparing individual dough portions (single serving) per work cycle especially suitable for flat breads and pizzas.

BACKGROUND OF THE INVENTION

Dough mixers for producing dough used in preparing foods are known which utilize the function of one or two screw conveyors, of rotating mixing arms within fixed or rotating containers with vertical or angled axis, or of kneading elements rotating within a closed housing with a horizontal axis.

The specific level of technology is based on this last type of dough mixer, which thus uses the function of mixing elements rotating within a closed casing on a horizontal axis.

The U.S. Pat. No. 5,486,049 (apparati for mixing liquid substances) refers to a device for mixing liquid substances of varying degrees of viscosity. The stirring element of this device comprises a plurality of rungs that are arranged between two coaxial disks equidistant from each other and to their rotational axis.

The U.S. Pat. No. 4,630,930 (high-speed batch mixer) publishes a method and device for producing a portion of dough. The device comprises two coaxial chambers within which there are separate work phases performed by separate and different mixing or kneading elements. The ingredients for preparing the dough are introduced from above into the first chamber, where they are thoroughly mixed and then transported into the second chamber. In the second chamber they are kneaded by a kneading element that comprises parallel rungs, which are attached at both ends to corresponding radial arms that extend at the same angles and rotate about a common axis. The technical features of the second device requires a previous thorough mixing in a mixing chamber that is separated from the kneading chamber; the casing line of the inside casing surface of the mixing chamber and of the kneading chamber have a rotational axis that is coaxial with the rotational axis of the kneading element.

The U.S. Pat. No. 5,322,388 (dough mixer) publishes a device for preparing dough which comprises a cylindrical chamber with a horizontal axis having in its upper region an opening for charging by free fall the ingredients that are used for preparing the dough, and in its lower region a closeable opening for discharging the prepared dough. The operation within the chamber takes place in the chamber's lower region by using several equidistant agitator blades on the same drive shaft with a rotational axis that is displaced but parallel to the chamber axis. The kneading chamber of this device can be opened because the disk-shaped vertical wall together with the agitator blades and the wall of the casing surface can be moved axially to the second vertical, disk-shaped wall, on which a scraper is located together with the corresponding drive motor.

There are other smaller mechanical devices for preparing dough in the household; generally, they comprise a cylindrical container with a vertical axis within which one or more agitator blades operate on a single drive shaft that is attached coaxially to the container axis.

All of these known devices are not designed for preparing individual dough portions per each work cycle within relatively short periods of time and by charging with ingredients in individual portions; further, they do not provide that every individual mixed dough portion that is rolled into a ball and is ready for shaping and baking can be discharged without leaving ingredients or dough residue inside the device. The known devices are also not designed to perform a periodic, completely automatic sterilization of the kneading chamber and its kneading elements.

The problem is also known that the charging of the kneading devices with relative exact volumetric metering of the flour or flour-like or dust-like ingredients, which are more or less hydroscopic. Such problems are based on the tendency that flour-like material forms accumulations or agglomerates inside the container, that varying the material volume above the metering mechanism strongly affects the metering process and that it is difficult to achieve an even filling and/or emptying of the metering chamber.

SUMMARY OF THE INVENTION

The present invention provides a dough mixer as described above that has a simple and compact design, can be automatically sterilized, has an essentially cylindrical chamber with horizontal axis in which a kneading element operates with horizontally rotating axis, due to direct charging of the chamber with pre-metered ingredients per work cycle, to create in a short period of time a portion of dough which then is finally discharged as a mixed individual portion in the form of a ball and ready-made for subsequent shaping, garnishing, and baking or deep-freezing.

In one aspect of the present invention, a housing is provided having an inner chamber that is essentially cylindrical and has in its upper section, which corresponds to the charging region for the flour-like and possibly also liquid ingredients, as well as in the lower section, which corresponds to the discharge region, a surface area that runs parallel to the chamber axis and turns into the chamber casing surface. Within this chamber operates a rotating kneading element according to an axis that runs coaxially or parallel to the chamber axis, and this element comprises at least one arm formed with one end attached radially to the end of a drive shaft, and on the other end of which at least one fixed bearing pin is attached cantelever with an axis running parallel to the rotational axis of the drive shaft; a freely turning sleeve is placed by means of a recessed hole on top of this bearing pin with rounded terminal ends on both sides. As an advantageous feature are two arms extending radially from the same drive shaft, which are oriented to each other longitudinally or are in the same level but are at a certain angle to each other, and each of these arms carries a bearing pin with a rotating sleeve placed on top parallel to the rotational axis, preferably with a different distance to the rotational axis of the drive shaft. While these bearing pins, which are equipped with rotating sleeves, are in motion, the dough is compressed, rolled and rolled thin repeatedly in particular in the lower region of the chamber with the level surface section that turns into the curved casing surface. If a plurality of sleeves are operated, they can have varying outside diameters, cross-sections, and shapes depending on the consistency of the dough being produced and/or the properties of the ingredients and/or the percentage of liquid ingredients. The invention provides further for the interchangeability and/or the change in the number of the sleeves mentioned, depending on the properties of the ingredients and/or the dough that is being prepared.

Due to the charging of the chamber with dry flour-like ingredients, the kneading element carries out the work phase with the purpose of homogenizing and aerating the dried ingredients by rotating at a relatively high speed in order to achieve a better thorough mixing of the ingredients thus introduced, and their preparation for the subsequent introduction of liquid ingredients, which ensures that they are evenly absorbed, and the dough agglomerate is then created with a markedly reduced rotational speed; by further reducing the speed, a mixing and homogenization of the dough mass is achieved, which then, upon further reduction in rotation speed, is compressed and rolled into balls, which as such are discharged in part due to gravity by opening the discharge opening in the region corresponding to the lower level surface section of the chamber.

In another aspect of the invention, the individual inner surfaces and surface areas of the dough mixer chamber have surface transitions with rounded areas with the largest possible radius, including the rotating arms or the sleeves of the kneading elements, all have rounded forms, and thus the chamber space is free of edges or recesses on which dough residue could stick that is not discharged along with the individual portion, due to the process by which the dough is kneaded and rolled into balls. After rolling into balls and discharging, the chamber and the kneading elements are thus free of any residue from the dough and ingredients. This form further allows them to be sterilized by means of hot air, through which small amounts of sticky dough residue are removed in the air current due to the drying process and the application of pressure.

The front surface of the chamber, which is across from the second front surface from which the drive shaft for the kneading element projects, can have a level, conical, more or less rounded form that protrudes against the drive shaft, with its axis extending coaxially to the rotational axis of the drive shaft or parallel to it preferably in the upper level of the chamber. By means of a distinctive conical or nose cone form, the rotating sleeves of the kneading element can roll the dough thin even with this shape. In this aspect of the invention, further, the housing wall that corresponds to this front interior surface with more or less distinctive shape can be replaced by another housing wall, in order to change the volume of the chamber by changing the distance between the front circular surfaces; in this case, the sleeves on the kneading element are also replaced by sleeves with the appropriate longitudinal extension.

In a preferred embodiment, the liquid ingredient(s) for preparing the dough is/are introduced through one or more openings in the central region at the front wall across from the wall with the drive shaft.

In terms of the volumetric metering of the dry, flour-like ingredients, one aspect of the invention proposes that a metering device be located in the region of the charging opening that is equipped e.g., with sliding blades, which essentially comprises a cylindrical container with vertical axis for the flour, and this container is equipped with a volumetric metering mechanism at its bottom. According to this embodiment, the container has inside in its lower region an annular, funnel-like partition, and the point of a distribution cone extends through the partition's central, circular opening so that an annular passageway is free for the flour. The container has at the bottom a metering sieve above which beaters move during the rotation of the distribution cone, which is driven by means of a vertical central shaft by a motor, in order to transport the flour through the metering sieve and through the holes which are positioned equidistant to the rotational axis on the metering disk located beneath it. The metering disk is located on the bottom disk, which is connected to the cylindrical wall of the container and which has an hole in the region of the charging opening of the dough mixer attached beneath it, through which the flour falls from the metering holes at the rotating metering disk and through the charging opening into the chamber of the dough mixer.

The invention does not exclude the possibility that the dough mixer, according to this invention, is fed from a metering device that has features other than those proposed by the invention, or from a device which charges with a pre-measured portion.

BRIEF DESCRIPTION OF THE DRAWINGS

The invention will be explained in more detail below based on a preferable exemplary embodiment that is represented schematically in the attached drawings of a dough mixer according to the invention that is charged according to the invention that prepares individual portions of 130–260 g within 10–15 seconds, which is especially suitable for preparing flat breads or pizzas.

FIG. 2 shows the dough mixer according to the invention and as shown in FIG. 1 together with a metering device in sectional view according to the plane of section II—II shown in FIG. 1.

DETAILED DESCRIPTION OF ILLUSTRATED EMBODIMENTS

Figure 1:
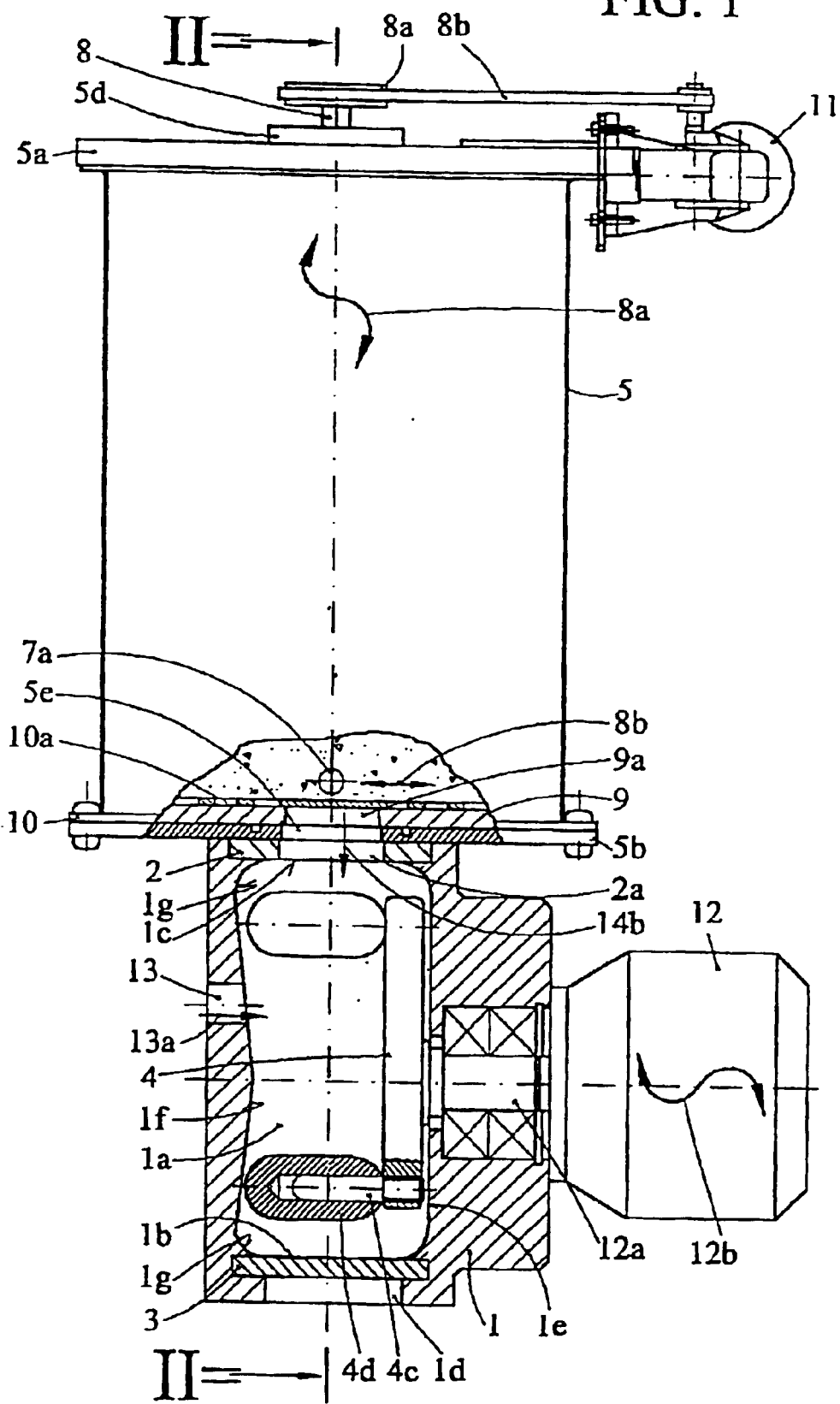
FIG. 1 shows in cross-section a dough mixer according to the invention during the charging phase, which is linked to a metering device according to the invention, showing a sectional view according to the plane of section 1:1 in FIG. 2, which plane runs through the axis of the drive shaft of the metering device.

According to this invention, the dough mixer for preparing individual portions comprises a housing 1 with an inner chamber and a kneading element 4, 4c, 4d, containing a charging opening 2a and a discharging opening 3a, 1d, with corresponding blades 2, 3. The essentially cylindrical chamber with horizontal axis is delimited by a level, circular surface 1e from which a shaft 12a extends coaxially, by a circular surface 1f corresponding to the aforementioned but with a conical form projecting slightly into the chamber, by two curved surfaces 1a with a casing line equidistant from the chamber axis, by an upper level surface section 1c that essentially corresponds to the region of the charging opening 2a, and by a lower level surface section 1b, which is larger than the upper one and corresponds to the region of the discharging opening 1d, 3a.

The kneading element comprises an arm 4 which is fastened on its front side at the end of the drive shaft 12a that extends into the chamber; at each of the ends of arm 4 a pin 4c is fastened having an axis running parallel to the rotational axis of the drive shaft 12a, and a freely turning 4b sleeve 4d with a rounded, hemispherical or nose cone-shaped terminal area is placed on each of pins 4c by means of a recessed hole. Arm 4 of the kneading element is fastened to drive shaft 12a, off-center relative to the center line of the transverse-extending arm, such that two pins 4c with sleeves 4d attached to it turn with varying radius about the rotational axis of drive shaft 12a, which is driven by the electric motor 12 at varying rotational speeds and changing rotation directions.

Charging opening 2a for the introduction 14b of the flour-like ingredients in the upper region and discharging opening 3a, 1d for the individual portions of dough balls in the lower region, are provided with sliding blades 2, 3, which for example are moved 2b, 3b by pneumatic cylinders 2c, 3c without excluding the use of rotating blades and other drives.

Liquid ingredients are charged via a single hole 13 or via specific holes for each of the liquid ingredients, which holes are conical and all preferably disposed on the disc-shaped wall 11 in the region within the track of sleeve 4d, which turns with smaller radius about shaft 4a. Same hole 13 can be used for blowing in hot air to clean and/or sterilize the chamber and rotating kneading elements 4, 4c, 4d. The method for preparing dough with the dough mixer according to this invention, has essentially the following phases:

Charging 14b with flour- or dust-like ingredients,
Homogenization and aeration of the flour- and/or dust-like ingredients,
Charging 13a with liquid ingredients,
Preparing the dough,
Rolling the dough thin,
Compacting and rolling the dough into balls
Discharging the individual dough portions Following production of a pre-programmed number of dough portions and based on the production intervals, the chamber of the dough mixer is cleaned and sterilized with hot air.

Charging 14b with flour-like and/or dust-like ingredients is by free fall through charging opening 2a equipped with sliding blades 2, which is driven 2b by pneumatic cylinder 2c. The construction and operation of the metering device, in accordance with the invention, with discharging opening 5e, corresponding to charging opening 2a of the dough mixer with which it is connected, will be explained later.

The flour-like and dust-like ingredients are homogenized and aerated by rotating kneading element 4, 4c, 4d at a relatively high speed (approx. 2,500–3,000 rpm) that creates a favorable dispersion of the ingredients due to the special form of the chamber and kneading elements, wherein the particles of the dry ingredients are prepared for even absorption of the liquid ingredients following charging 13a.

The dough mixture is prepared by rotating 4a kneading element 4, 4c, 4d at a lower rotation speed (approx. 950–1,400 rpm); this phase is followed initially by the formation of little dough clumps, which are then rolled together by the repeated action of rotating 4b sleeves 4d.

The dough is then prepared by rotating kneading element 4, 4c, 4d at an even lower rotation speed (approx. 850–920 rpm); especially in this phase, the dough is repeatedly and intensely rolled out and rolled thin by the turning 4b sleeves 4d, particularly at lower level surface section 1b. The formation of a compact, balled together dough mass follows at an even lower rotation speed (approx. 700–820 rpm), thus taking on the form of a "dough ball" at the end of this phase.

The "dough ball" is discharged by centrifugal force via the rotating kneading element and by gravity through discharging opening 3a, which is opened by activating 3b blade 3 by means of pneumatic cylinder 3c.

During the various work stages, in particular during compacting, rolling out, and balling together the dough, it can be advantageous to make one or more changes in rotational direction 4a of kneading element 4, 4c, 4d. Liquid ingredients can be charged 13a more or less in stages and while kneading element 4, 4c, 4d is rotating. For cleaning and/or sterilization of the chamber by injecting hot air, the cool air of motor 12 that drives 12a the kneading element or the air that is diverted from the pneumatic system can be used, the air being heated prior to its injection into the chamber.

The volumetric metering device for the dry flour-like ingredients according to the invention comprises a cylindrical container 5, 5a, 5b with vertical axis, a distribution cone 7 with beaters 7a, 7b rotating 8a coaxially to the container axis, and a metering disk 9 with metering holes 9a on the rim which form the volume units for creating a total portion of flour 14 to be charged 14b into the dough mixer in order to generate a single portion of dough.

Cylindrical vertical wall 5 is sealed with bottom plate 5b, which provides a seating 5c for the bottom end of a vertically rotating 8a shaft 8 that is centrally seated 5d in cover plate 5a. The upper end of shaft 8, which extends beyond the cover plate 5a, is equipped with a pulley 8a driven by the belt 8b of a motor 11 attached to the container. Shaft 8 can naturally be driven in other ways and by other sources of power. Inside, in the lower region, the container is equipped with an annular, funnel-like partition 6 for directing flour 14 in the direction of the container axis. The upper region of a distribution cone 7, which is connected to drive shaft 8, extends through the central opening in partition 6 such that an annular duct 6c results for flour, beaters 7b that extend down from the cone 6 and move closely above partition 6 cause flour 14 to pass through 14a Partition 6 and cone 7 prevent variations in the fill level of flour 14 and thus the weight above partition 6 from having an affect on the metering mechanism disposed beneath. This mechanism comprises metering disk 9 with holes 9a on rim that rotates together distribution cone 7 and drive shaft 8; individual holes 9a, which are equidistant to the axis of rotation of the disk, represent with their volume the metering unit for creating the charging amount. Above metering disk 9 is a sieve 10 equipped with ducts 10a through which the flour is moved through at least one beater 7c which sticks out from cone 7, and turns with drive shaft 9, and moves above sieve 10. On the underside, metering disk 9 lies on top of bottom disk 5b of the container. Bottom disk 5b has an outflow through hole 5e that corresponds in diameter to holes 9a on metering disk 9 or is of a greater diameter and in the region of the passage of these holes. Practice has shown that the construction described here allows volumetric metering that is independent of the fill level in the container, the moisture level and other physical properties of the contents, which metering is sufficiently constant and can be varied by one or more volume units that are determined by individual holes 9a on metering disk 9. This feature of the metering device is fundamental for achieving homogeneity in the individual dough portions, which requires charging with calibrated, homogeneous ingredients and attains this above all by assuring that the mixture does not put weight on the metering mechanism in a single casing 5, 5a, 5 which is fed via a relatively narrow annular duct 6c and, affected by simultaneous mixing motions in the container region above the partition 6 and in the emptying region of the metering holes 9a and at the metering disk 9. Naturally, the amount of flour 14, which moves through annular duct 6c, must be at least as great, preferably somewhat greater than the amount which is fed to the dough mixer for the purpose of maintaining the individual portion of dough.

The invention does not exclude the possibility of linking the metering device according to the invention to a dough mixer or another device that does not correspond to the dough mixer according to the invention.

What is claimed is:

1. A dough mixer for the production of dough, comprising:
    a closed housing with horizontal housing axis, the housing having two inner, essentially circular, juxtaposed, coaxial and separated surfaces between which two casing surface sections extend which run in an arc along the same casing line and change in the upper and lower region into a flat surface section, the flat surface sections each at least partially formed by the surface of a sliding blade in its closed position, wherein one circular surface, across from a circular surface from which a drive shaft extends for a kneading element, has a slight conical or domed form projecting into the housing, coaxially to the rotational axis of the kneading element; and
    the kneading element operating with a rotational axis coaxial or parallel to the housing axis.

2. A dough mixer for the production of dough, comprising:
    a closed housing with horizontal housing axis, the housing having two inner, essentially circular, juxtaposed, coaxial and separated surfaces between which two casing surface sections extend which run in an arc along the same casing line and change in the upper and lower region into a flat surface section, the flat surface sections each at least partially formed by the surface of a sliding blade in its closed position, wherein one circular surface, across from a circular surface from which a drive shaft extends for a kneading element, has a distinctive conical, nose cone-shaped, or cylindrical form with hemispherical end that is coaxial or parallel to the rotational axis of the kneading element; and
    the kneading element operating with a rotational axis coaxial or parallel to the housing axis.

3. A dough mixer for the production of dough, comprising:
    a closed housing with horizontal housing axis, the housing having two inner, essentially circular, juxtaposed, coaxial and separated surfaces between which two casing surface sections extend which run in an arc along the same casing line and change in the upper and lower region into a flat surface section, the flat surface sections each at least partially formed by the surface of a sliding blade in its closed position, wherein one circular surface, across from a circular surface from which a drive shaft extends for a kneading element, has one or more holes for supply of liquid ingredients into the housing, the one or more holes located in a central region of the circular surface, within a circular track defined by ends of the kneading element; and
    the kneading element operating with a rotational axis coaxial or parallel to the housing axis.

4. A dough mixer for the production of dough, comprising:
    a closed housing with horizontal housing axis, the housing having two inner, essentially circular, juxtaposed, coaxial and separated surfaces between which two casing surface sections extend which run in an arc along the same casing line and change in the upper and lower region into a flat surface section, the flat surface sections each at least partially formed by the surface of a sliding blade in its closed position; and
    a kneading element operating with a rotational axis coaxial or parallel to the housing axis,
    wherein the housing of the dough mixer and the kneading element are occasionally subjected to moving hot air introduced through a hole or nozzle and which exits through a discharge opening in the housing, the hot air generated by a drive motor of the dough mixer or from a pneumatic system and heated prior to entry, the hot air sterilizing the housing and the kneading element, loosening any bits of dough or leftover ingredients and transporting same by means of the exiting stream of air.

5. A dough mixer for the production of dough, comprising:
    a closed housing with horizontal housing axis, the housing having two inner, essentially circular, juxtaposed, coaxial and separated surfaces between which two casing surface sections extend which run in an arc along the same casing line and change in the upper and lower region into a flat surface section, the flat surface sections each at least partially formed by the surface of a sliding blade in its closed position; and
    a kneading element operating with a rotational axis coaxial or parallel to the housing axis, wherein the kneading element includes:
        an arm extending radially from an end of a drive shaft of the kneading element;
        two fixed pins, one pin being attached to each free end of the arm, the pins having a longitudinal axis parallel to the rotational axis of the kneading element; and
        two cylindrical sleeves, one sleeve attached to each fixed pin by an axially recessed hole allowing the sleeve to freely turn relative to the fixed pin, wherein terminal regions of each sleeve are rounded-off, round-ended, or nose cone-shaped.

6. The dough mixer of claim 5, wherein the arm is fastened off-center to the drive shaft such that the two fixed pins turn with varying radius about the rotational axis of the kneading element.

7. A dough mixer for the production of dough, comprising:
    a closed housing with horizontal housing axis, the housing having two inner, essentially circular, juxtaposed, coaxial and separated surfaces between which two casing surface sections extend which run in an arc along the same casing line and change in the upper and lower region into a flat surface section, the flat surface sections each at least partially formed by the surface of a sliding blade in its closed position; and
    a kneading element operating with a rotational axis coaxial or parallel to the housing axis, wherein the kneading element includes:
        a plurality of arms, each extending radially along a drive shaft of the kneading element at some distance from an end of the drive shaft;
        a fixed pin attached to each free end of each of the plurality or arms, each fixed pin having a longitudinal axis parallel to, and not equidistant from, the rotational axis of the kneading element; and
        a cylindrical, freely turning sleeve attached to each fixed pin.

8. The dough mixer of claim 7, wherein an inner housing wall, corresponding to the one circular surface across from the circular surface from which the drive shaft extends for the kneading element, is replaceable with a housing wall that changes the distance between the two circular surfaces, and depending on this change in distance, the sleeves are replaced by sleeves with appropriate longitudinal extension.

9. A dough mixer for the production of dough, comprising:
- a closed housing with horizontal housing axis, the housing having two inner, essentially circular, juxtaposed, coaxial and separated surfaces between which two casing surface sections extend which run in an arc along the same casing line and change in the upper and lower region into a flat surface section, the flat surface sections each at least partially formed by the surface of a sliding blade in its closed position;
- a kneading element operating with a rotational axis coaxial or parallel to the housing axis; and
- a metering device having a cylindrical container with vertical longitudinal axis, the cylindrical container including:
  - a dust storage area in an upper region;
  - a metering mechanism in a lower region;
  - at least one dust stirring element operating in the upper region;
  - at least one metering stirring element operating in the lower region;
  - a distribution cone in the lower region;
  - a metering disk with a plurality of metering holes equally spaced from one another, and equally spaced from a rotational axis of the metering disk, the metering holes being located along a rim of the metering disk;
  - a shaft that rotates coaxially with the vertical longitudinal axis of the cylindrical container to activate the dust stirring elements, the metering stirring elements, the distribution cone, and the metering disk to provide predetermined portions of dust to the dough mixer; and
  - an annular, funnel-like partition, through a central opening of which an upper part of the distribution cone extends to form an annular duct for the dust to enter the metering region.

10. The dough mixer with metering device of claim 9, wherein at least one dust stirring element operates, extending radially from the distribution cone near an upper surface of the partition.

11. The dough mixer with metering device of claim 9, wherein the metering disk is positioned between a fixed, level bottom plate of the cylindrical container and an annular, fixed sieve, and the bottom plate includes an outflow opening within the track of the metering holes of the rotating metering disk.

12. The dough mixer with metering device of claim 11, wherein the sieve includes ducts through which the dust passes and wherein at least one metering stirring element, extending radially from the distribution cone, passes close to the sieve during rotation of the cone.

13. A method for producing dough, comprising the steps of:
a. charging a mixing region with flour-like or dust-like ingredients by free fall;
b. homogenizing and aerating the flour-like or dust-like ingredients by rotating a kneading element at a relatively high speed;
c. introducing liquid ingredients to the flour-like or dust-like ingredients;
d. preparing a dough mixture by rotating the kneading element at a lower speed to form and roll together little dough clumps;
e. preparing the dough by rotating the kneading element at an even lower speed to roll out and roll thin the dough;
f. forming a single, compact, balled together dough mass by rotating the kneading element at a lowest speed; and
g. discharging the single, balled together dough mass by centrifugal force via the rotating kneading element and by gravity.

14. The method of claim 13, wherein charging the mixing region by free fall occurs through a charging opening in the mixing region equipped with a sliding blade.

15. The method of claim 13, wherein the relatively high speed is between about 2,500 and 3,000 rpm.

16. The method of claim 13, wherein the lower speed is between about 950 and 1,400 rpm.

17. The method of claim 13, wherein the little dough clumps are formed and rolled together by repeated action of rotating sleeves of the kneading element.

18. The method of claim 13, wherein the even lower speed is between about 850 and 920 rpm.

19. The method of claim 13, wherein the dough is rolled out and rolled thin by freely turning sleeves against a lower level surface of the mixing region.

20. The method of claim 13, wherein the lowest speed is between about 700 and 820 rpm.

21. The method of claim 13, wherein discharging the single, balled together dough mass occurs through a discharge opening in the in the mixing region equipped with a sliding blade.

22. The method of claim 13, wherein the rotational direction of the kneading element changes one or more times during various method steps.

23. A dough mixer for the preparation of dough, comprising:
- a closed housing having two inner, essentially circular, juxtaposed and separated surfaces between which two casing surface sections extend which run in an arc and change in the upper and lower region into a flat surface section, the flat surface sections each at least partially formed by the surface of a sliding blade in its closed position; and
- a kneading element including:
  - at least one fixed pin extending from an arm communicating with a drive shaft of the kneading element and having a longitudinal axis parallel to a rotational axis of the drive shaft; and
  - a sleeve rotatably attached to each pin, the sleeve capable of free spin about a longitudinal axis of the fixed pin.

24. The dough mixer of claim 23 having a plurality of pins and sleeves, wherein the sleeves have varying outside diameters, cross-sections, and shapes depending on a consistency of the dough being prepared, properties of ingredients being mixed, or a percentage of liquid ingredients employed.

* * * * *